(12) United States Patent
Ramachandiran et al.

(10) Patent No.: US 12,348,577 B2
(45) Date of Patent: Jul. 1, 2025

(54) TECHNIQUES FOR EFFICIENT CONTENT DELIVERY IN A MULTICAST ADAPTIVE BIT RATE (MABR) SYSTEM

(71) Applicant: ARRIS Enterprises LLC, Suwanee, GA (US)

(72) Inventors: Kanakendiran Ramachandiran, Chennai (IN); Varma L. Chanderraju, San Jose, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 18/216,478

(22) Filed: Jun. 29, 2023

(65) Prior Publication Data
US 2024/0022622 A1 Jan. 18, 2024

Related U.S. Application Data

(60) Provisional application No. 63/388,869, filed on Jul. 13, 2022.

(51) Int. Cl.
*H04L 65/75* (2022.01)
*H04L 65/1045* (2022.01)
*H04L 65/611* (2022.01)

(52) U.S. Cl.
CPC ........ *H04L 65/765* (2022.05); *H04L 65/1045* (2022.05); *H04L 65/611* (2022.05)

(58) Field of Classification Search
CPC . H04L 65/765; H04L 65/1045; H04L 65/611; H04L 65/612; H04L 67/563; H04L 65/752; H04L 67/1095; H04L 67/1097; H04L 67/02; H04L 67/568; H04N 21/2183; H04N 21/6405; H04N 21/8456;
(Continued)

(56) References Cited

U.S. PATENT DOCUMENTS

2014/0344391 A1* 11/2014 Varney ................... H04L 41/50
709/213
2016/0294898 A1* 10/2016 Wheelock .......... H04N 21/8543
(Continued)

OTHER PUBLICATIONS

International Search Report and Written Opinion RE: Application No. PCT/US2023/026639, dated Sep. 18, 2023.
(Continued)

*Primary Examiner* — David R Lazaro
*Assistant Examiner* — Zia Khurshid
(74) *Attorney, Agent, or Firm* — Chernoff, Vilhauer, McClung & Stenzel, LLP

(57) ABSTRACT

Techniques for efficient content delivery in an MABR system. Precisely, the disclosure recites a method comprising receiving, at an MABR client device, a manifest request from an ABR player, wherein the manifest request is initially redirected to the MABR client device by a rendezvous service upon updating the manifest request with a channel ID and an upstream CDN base information. The method further recites translating, by the MABR client device, the manifest request with a representation ID and obtaining a stream ID from the translated manifest request. The method further discloses performing look up in a cache for media content, requested in the translated manifest request, using the obtained stream ID.

15 Claims, 16 Drawing Sheets

(58) Field of Classification Search
CPC ....... H04N 21/26258; H04N 21/64322; H04N 21/23106
See application file for complete search history.

(56) References Cited

U.S. PATENT DOCUMENTS

2016/0323348 A1 11/2016 Bradbury et al.
2023/0379516 A1* 11/2023 Kwon .................... H04W 4/06

OTHER PUBLICATIONS

Richard Bradbury BBC: "TM-MCAST0025r11 DVB-MABR Phase 2 Technical Specification editor's draft", DVB, Digital Video Broadcasting, C/O EBU—17A Ancienne Route—CH-1218 Grand Saconnex, Geneva—Switzerland, No. 2, Jun. 21, 2022, XP017863472, Retrieved from the Internet: URL:https://member.dvb.org/wg/TM-MCAST/documentRevision/download/47854 TM-MCAST0025r11 DVB-MABR Phase 2 Technical Specification editor' draft.com [retrieved on Jun. 21, 2022].

Richard Bradbury BBC: "TM-MCAST0073r4 Implementation guidelines and worked examples editors' draft", DVB, Digital Video Broadcasting, C/O EBU—17A Ancienne Route—CH-1218 Grand Saconnex, Geneva—Switzerland, No. 3, Dec. 22, 2021, Retrieved from the Internet: URL:https://member.dvb.org/wg/TM-MCAST/documentRevision/download/47110TM=CAST0073r4 Implementation guidelines and worked examples editor's draft.doc [retrieved on Dec. 22, 2021].

"3rd Generation Partnership Project; Technical Specification Group Services and System Aspects; Multicast Architecture Enhancement for 5G Media Streaming (Release 17)", 3GPP Draft; S4-210236, 3rd Generation Partnership Project (3gpp), Mobile Competence Centre; 650, Route Des Lucioles ; F-06921 Sophia-Antipolis Cedex; France, Feb. 5, 2021. XP052171354, Retrieved from the Internet: URL:https://ftp.3gpp.org/tsg_sa/WG4_CODEC/TSGS4_112-e/Docs/S4-210236.zip Draft TR26.802 v0.2.2—Client.doc [retrieved on Feb. 5, 2021].

Guillaume Pierre Bichot Broadpeak : "TM-MCAST0031 Configuration for in-band carriage of presentation manifest and initialisation segments", DVB, Digital Video Broadcasting, C/O EBU—17A Ancienne Route—CH-1218 Grand Saconnex, Geneva—Switzerland, No. 6, Nov. 17, 2021, XP017892649, Retrieved from the Internet: URL: https://member.dvb.org/wg/TM-MCAST/documentRevision/download/46950 TM-MCAST0031 Configuration for in-band carriage of presentation manifest and initialisation segments.doc [retrieved on Nov. 17, 2021].

* cited by examiner

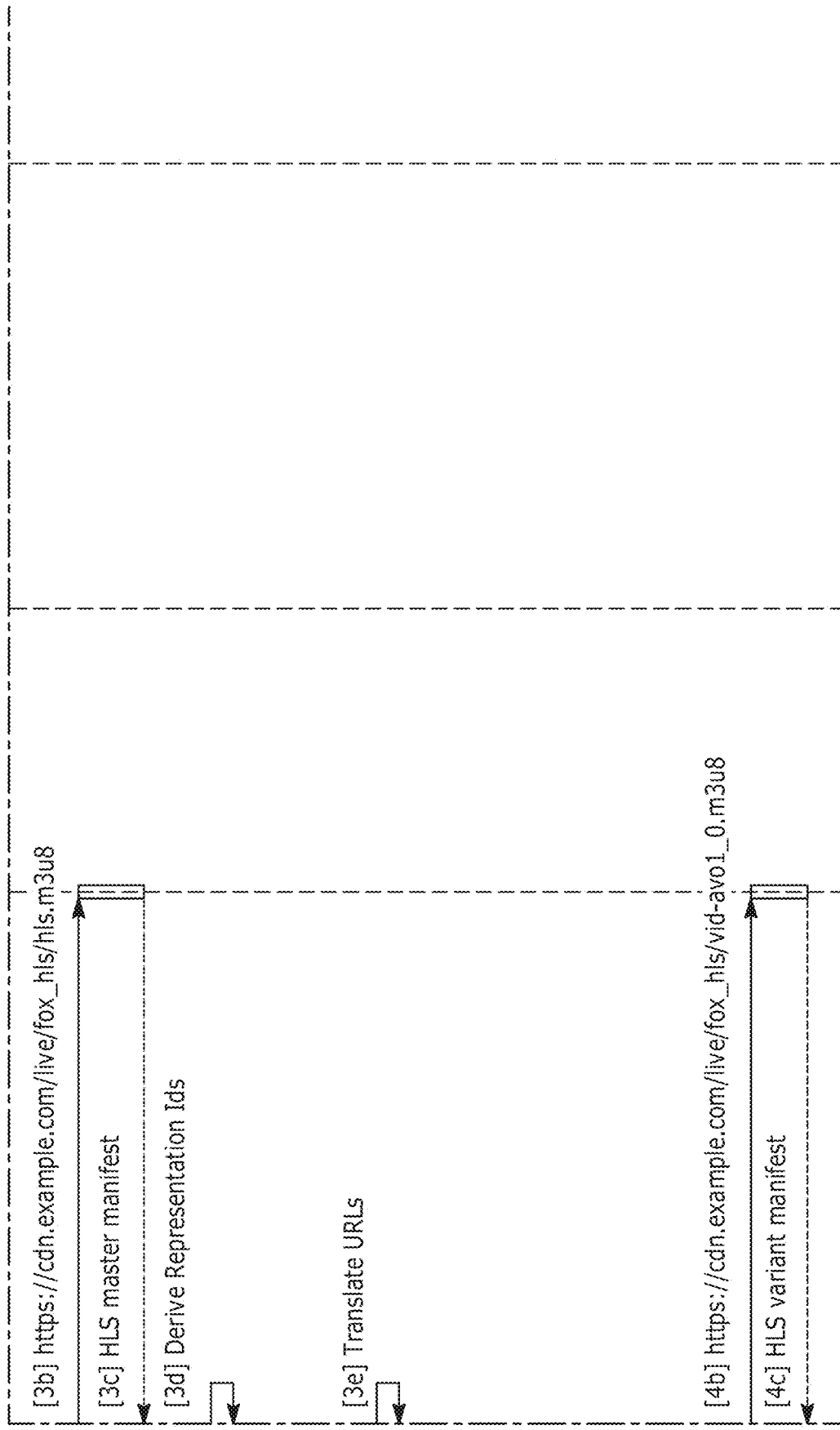

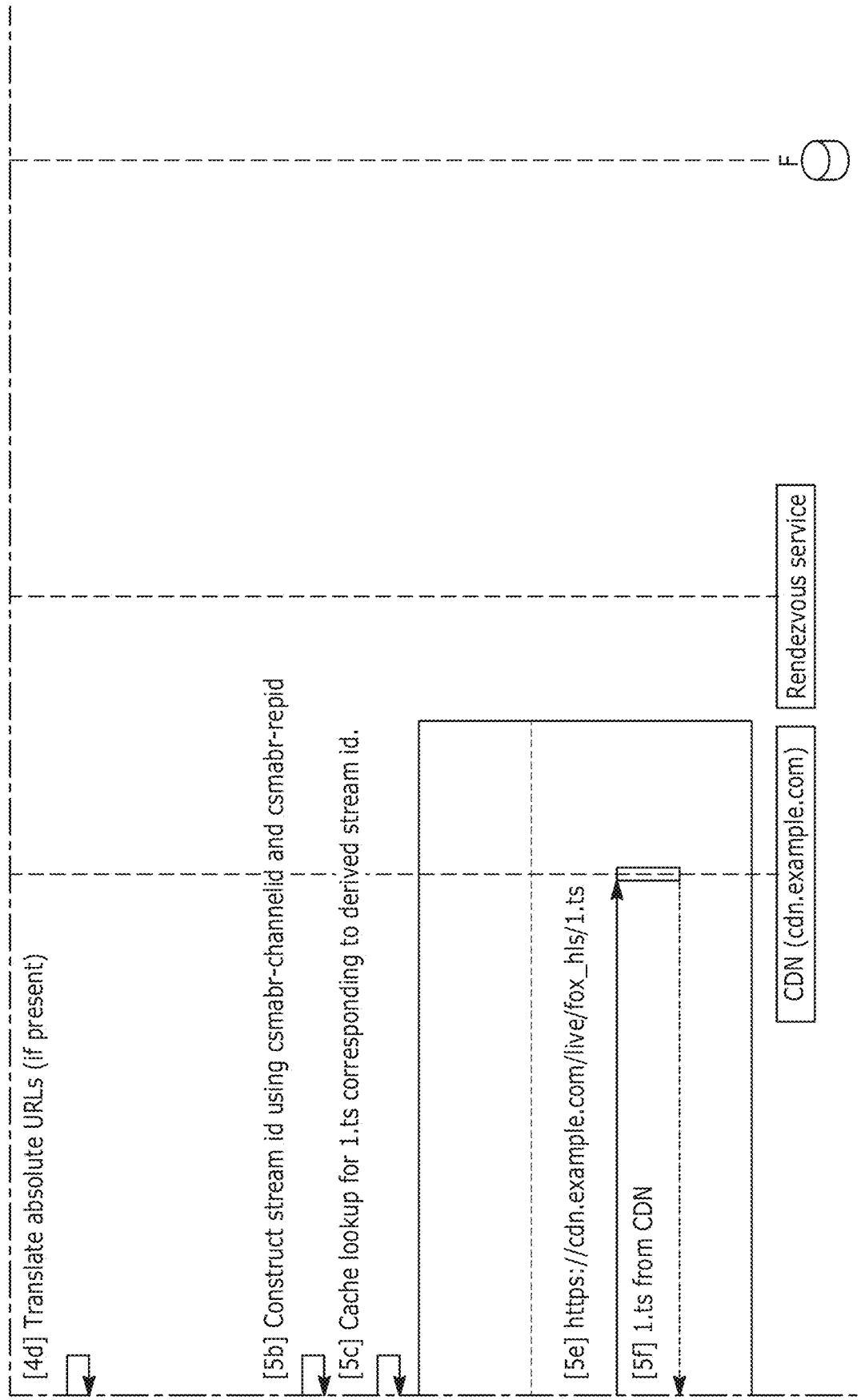

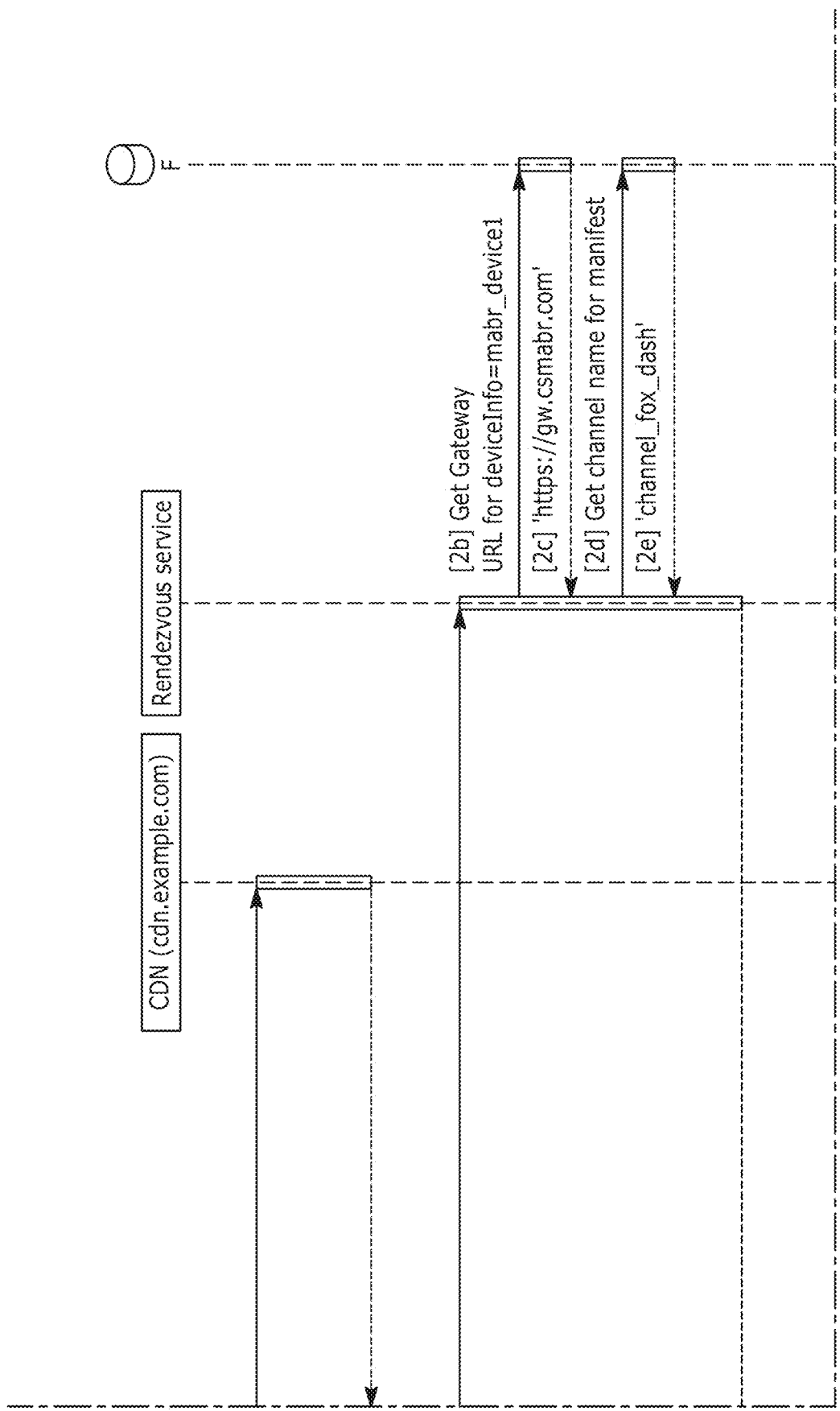

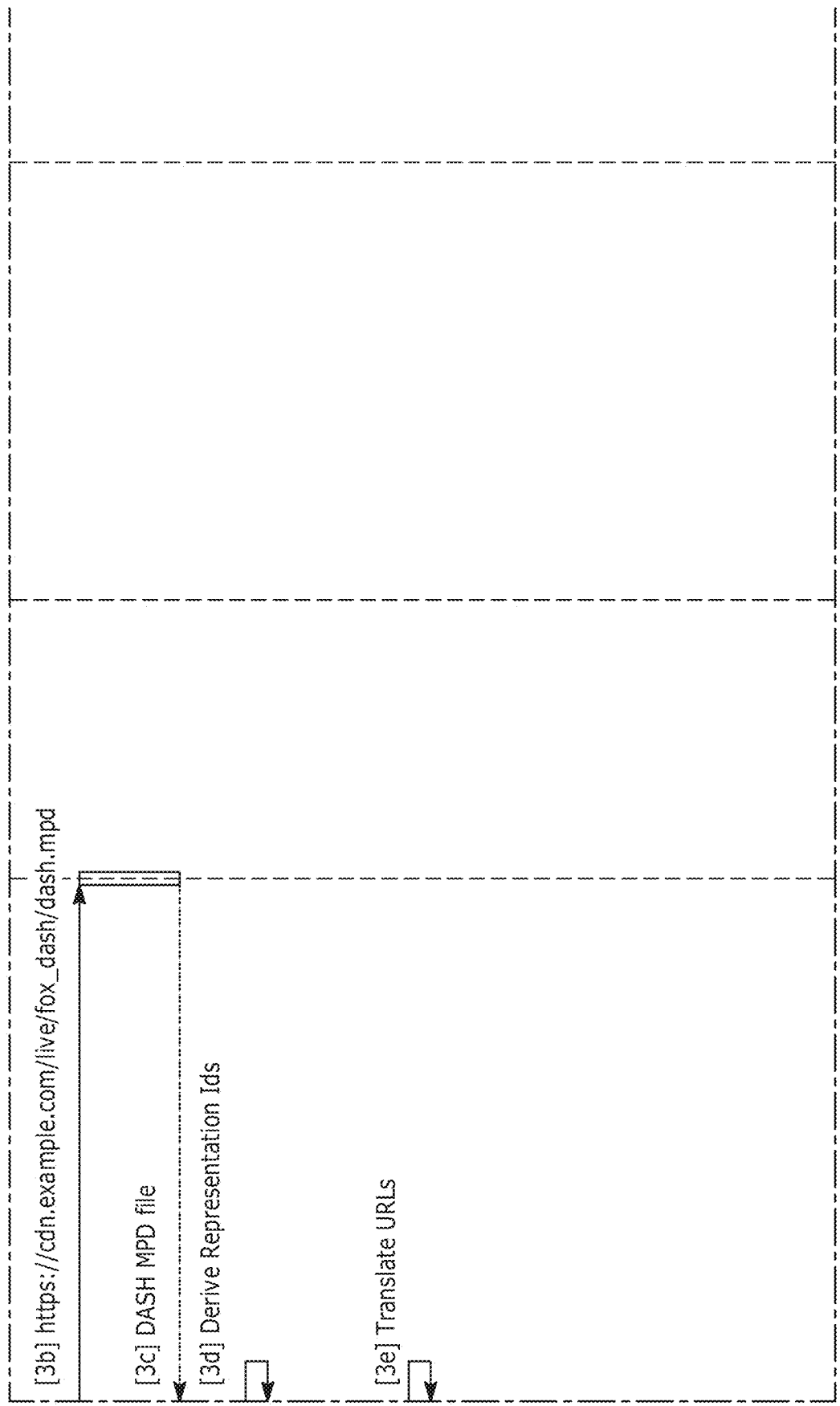

TECHNIQUES FOR EFFICIENT CONTENT DELIVERY IN A MULTICAST ADAPTIVE BIT RATE (MABR) SYSTEM

CROSS-REFERENCE TO RELATED APPLICATIONS

The present application claims priority to U.S. Provisional App. No. 63/388,869 filed Jul. 13, 2022, the contents of which is incorporated herein by reference in its entirety.

TECHNICAL FIELD

The present disclosure in general relates to Multicast Adaptive Bit Rate (MABR) system. More particularly, but not exclusively, to techniques for efficient content delivery in a Multicast Adaptive Bit Rate (MABR) system.

BACKGROUND

In Multicast Adaptive Bit Rate (MABR) systems, for efficient content delivery to a user device (supported by an Adaptive Bit Rate (ABR) player), it is essential that MABR server and MABR client device (also referred herein as client gateway) agree upon a common set of parameters. These common set of parameters provide complete information about the content to be delivered by the MABR client device to an Adaptive Bit Rate (ABR) player and thereafter to the user device. In addition, the MABR client device should be able to determine the required parameters for each media segment request originating from the ABR player. These parameters may include content identifiers, upstream information, operator specific information, if any and like parameters that are required for efficient content delivery. Further, the content identifiers parameters may include channel ID (unique identifier for an ABR content) and representation ID (unique identifier for a variant stream within the content), whereas upstream information may include HTTP(S) CDN URL of the ABR content.

In existing technologies, the derivation/retrieval of these common set of parameters is generally done by relying on the format of the content request, received in the form of a URL. The two most common approaches followed for derivation/retrieval of these common set of parameters include: (1) a packager producing the URL with all the necessary information in a pre-defined format, in which technique the MABR client device and the MABR server may do a regex-based parsing to retrieve those values; and (2) configuring the URL prefix that maps to those parameters and a service to retrieve the required information then MABR client device and the MABR server may use this service to obtain the parameters.

However, these prior art techniques have their own drawbacks. For example, using the first technique puts a requirement on the packager to produce the URLs in a required format. One skilled in the art will appreciate that it is often impractical to do so as there may be contents created using different packagers and all of them cannot be expected to conform to the required format. The problem with the second technique is that there is a very high possibility that different packagers may generate similar URL prefixes for different contents. Even a same packager generating all the variant streams in the same directory may be problematic. This makes integration of new CDN/packagers a difficult task.

Thus, there exists a need for the technology for efficient content delivery in an MABR system without having a need for a packager to either produce the URL with all the necessary information in a pre-defined format or configuring the URL prefix that maps to those parameters and a service to retrieve this information.

The information disclosed in this background section is only for enhancement of understanding of the general background of the invention and should not be taken as an acknowledgement or any form of suggestion that this information forms the prior art already known to a person skilled in the art.

SUMMARY

According to an aspect of the present disclosure, a method, a system and a computer readable medium for efficient content delivery in a Multicast Adaptive Bit Rate (MABR) system are disclosed.

In another non-limiting embodiment of the present disclosure, a method for efficient content delivery in the MABR system is disclosed. The method discloses receiving, at an MABR client device, a manifest request from an ABR player, wherein the manifest request is initially redirected to the MABR client device by a rendezvous service upon updating the manifest request with a channel ID and an upstream CDN base information. The method further includes translating, by the MABR client device, the manifest request by adding representation ID, wherein the representation ID uniquely identifies a variant stream within a media content. Further, the method discloses obtaining a stream ID by combining the channel ID and the representation ID and performing look up in a cache for media content, requested in the translated manifest request, using the obtained stream ID. The method further discloses providing the media content to the ABR player if the media content is present within the cache, else performing a search in upstream CDN's, if the media content is not present within the cache.

In another non-limiting embodiment of the present disclosure, for updating the manifest request the method further discloses receiving, at the rendezvous service, an initial manifest request having a query parameter included therein. The method further discloses performing a lookup operation, at an MABR server, to identify MABR client associated with device information contained within the updated manifest request and performing a reverse lookup operation, at the MABR server, to identify the channel ID corresponding to the updated initial manifest request.

In another non-limiting embodiment of the present disclosure the method further discloses fetching a manifest from an upstream CDN proxy server, in response to receiving the manifest request from the ABR player and deriving the representation ID from the fetched manifest.

In another non-limiting embodiment of the present disclosure, the query parameter is added to the initial manifest request as an identifier to capture CDN base information, in response to receiving the initial manifest request, at the upstream CDN proxy server, from the ABR player.

In another non-limiting embodiment of the present disclosure, for fetching the manifest from the upstream CDN proxy server, the method further discloses downloading a master manifest and a variant manifest, separately, when using HLS playback format. Whereas, in case of MPEG-DASH playback format, the method discloses downloading one-time manifest, in the form of DASH MPD file.

In a further non-limiting embodiment of the present disclosure, a Multicast Adaptive Bit Rate (MABR) system for efficient content delivery is disclosed. The MABR system comprises an Adaptive Bit Rate (ABR) player, a CDN proxy server operatively coupled to the ABR player and an MABR client device operatively coupled to the CDN proxy server and the ABR player. Further, the MABR client device includes a transceiver configured to receive a manifest request from the ABR player, wherein the manifest request is initially redirected to the MABR client device by a rendezvous service upon updating the manifest request with a channel ID and an upstream CDN base information. The MABR client device further discloses having a processor operatively coupled to the transceiver. In an embodiment, the processor is configured to translate the manifest request by adding representation ID, wherein the representation ID uniquely identifies a variant stream within a media content. The processor is further configured to obtain a stream ID by combining the channel ID and the representation ID and perform look up in a cache for media content, requested in the translated manifest request, using the obtained stream ID. The processor is further configured to provide the media content to the ABR player if the media content is present within the cache or perform a search in upstream CDN's, if the media content is not present within the cache.

In a furthermore non-limiting embodiment of the present disclosure, a non-transitory computer readable media storing one or more instructions executable by at least one processor is disclosed. The one or more instructions comprising one or more instructions for receiving, at an MABR client device, a manifest request from an ABR player, wherein the manifest request is initially redirected to the MABR client device by a rendezvous service upon updating the manifest request with a channel ID and an upstream CDN base information. The computer readable media further comprising one or more instructions for translating, by the MABR client device, the manifest request by adding representation ID, wherein the representation ID uniquely identifies a variant stream within a media content and one or more instructions for obtaining a stream ID by combining the channel ID and the representation ID. Further, the computer readable media comprising one or more instructions for performing look up in a cache for media content, requested in the translated manifest request, using the obtained stream ID and one or more instructions for providing the media content to the ABR player if the media content is present within the cache. If the media content is not present within the cache, the computer readable media further comprising one or more instructions for performing a search in upstream CDN's.

The foregoing summary is illustrative only and is not intended to be in any way limiting. In addition to the illustrative embodiments, and features described above, further embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. Some embodiments of system and/or methods in accordance with embodiments of the present subject matter are now described, by way of example only, and with reference to the accompanying Figures, in which.

Figure 1:
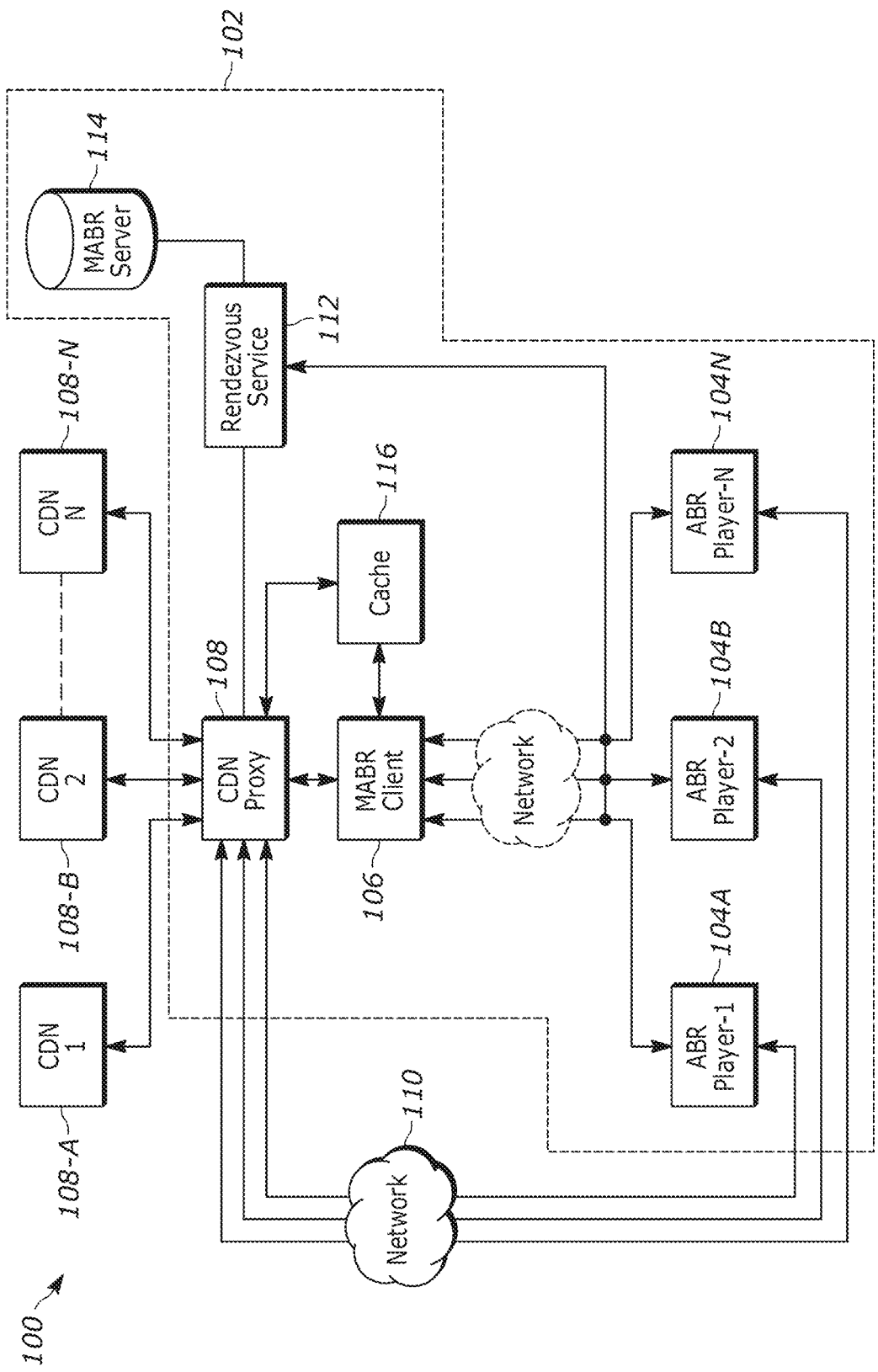
FIG. 1 shows a high-level architecture 100 illustration of a Multicast Adaptive Bit Rate (MABR) system interacting with plurality of Content Delivery Network (CDN) for efficient content delivery.

It should be appreciated by those skilled in the art that any block diagrams herein represent conceptual views of the illustrative systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the particular form disclosed, but on the contrary, the disclosure is to cover all modifications, equivalents, and alternatives falling within the spirit and the scope of the disclosure.

The terms "comprise(s)", "comprising", "include(s)", or any other variations thereof, are intended to cover a non-exclusive inclusion, such that a setup, device, apparatus, system, or method that comprises a list of components or steps does not include only those components or steps but may include other components or steps not expressly listed or inherent to such setup or device or apparatus or system or method. In other words, one or more elements in a device or system or apparatus proceeded by "comprises . . . a" does not, without more constraints, preclude the existence of other elements or additional elements in the system.

The terms like "at least one" and "one or more" may be used interchangeably or in combination throughout the description.

In the following detailed description of the embodiments of the disclosure, reference is made to the accompanying drawings that form a part hereof, and in which are shown by way of illustration of specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense. In the following description, well known functions or constructions are not described in detail since they would obscure the description with unnecessary detail.

The present disclosure describes methods, systems, and computer readable media for effective integration of plurality of Content Delivery Network (CDN) with a Multicast Adaptive Bit rate (MABR) system to provide efficient content delivery to end users. The MABR system is well known to solve the problem of high bandwidth consumption experienced due to ever-increasing usage of Over the Top (OTT) platforms, that are unicast based content delivery system, by multicasting the OTT content to MABR client devices/client gateway in the client side which can then serve the in-house ABR player devices which results in significant bandwidth savings. In the MABR system whenever an ABR player requests the MABR client device for a media segment, the MABR client device first checks if it is available in its cache (obtained over multicast) and delivers it. If not available in the cache, the MABR client device fetches the segment from the upstream CDN and delivers it to the ABR player.

In order make the multicast system efficient, it is essential that both MABR server and MABR client device agree upon a common set of parameters that gives a complete information to the MABR client device about the content requested by the ABR player. In addition, the MABR client device should be able to figure out the required parameters for each media segment requested by the ABR player.

Conventionally, the derivation/retrieval of these common set of parameters is generally done by relying on the format of the content URL prepared by a packager. One common approach used for retrieval of these common set of parameters is that a packager produces the URL with all the necessary information in a pre-defined format and the MABR client device and the MABR server may do a regex-based parsing to retrieve these parameters. A major problem confronted with this approach is that it puts a requirement on the packager to produce the URLs in a required format. It is impractical to do so as there can be contents created using different packagers and all of them cannot be expected to conform to same format. Another common approach used in the conventional art is configuring the URL prefix that maps to those parameters and a service to retrieve this information. The problem with this approach is that it is quite possible that different packagers may generate similar URL prefixes for different content. Also, same packager generating all the variant streams in the same directory may be problematic. Therefore, use of any of the above discussed approaches makes integration of new CDN/packagers a difficult task.

In an embodiment, the present disclosure achieves this objective by translating the content URLs to include the required parameters (that are required to access the content requested in the URL) as a metadata. By doing so the MABR client device will have all the necessary information by just looking at the translated URL of the incoming media segment requests from the ABR player. Those skilled in the art will appreciate that this information is necessary to associate a particular request to one of the existing contents supported by the MABR server or to redirect them to the upstream CDN on a cache miss. The various embodiments of the present disclosure are described below in more details.

Referring now to FIG. 1, an exemplary high-level architecture 100 illustrating an effectively integrating of a Multicast Adaptive Bit Rate (MABR) system 102 with a plurality of Content Delivery Network (CDN) 108, for efficient content delivery, is shown. The architecture 100 discloses the MABR system 102 comprising a plurality of Adaptive Bit Rate (ABR) Players represented by 104-A, 104-B and 104-N. The ABR players 104-A, 104-B and 104-N are configured to provide multimedia content, streamed through a content source, to end users (not shown) for viewing based on the available network bandwidth. To access the content requested by the end user (not shown), the ABR player 104-A, 104-B, 104-N remains in communication with an MABR client device 106 also referred herein as client gateway device and a Content Delivery Network (CDN) proxy server 108 through a network 110.

In an aspect, FIG. 1 depicts a broad architectural overview of the MABR system 102 integrated with the plurality of content delivery network's (CDN) 108. The architecture 100 only discloses system/unit/elements/components essential for explaining the present disclosure and there may be several other system/unit/elements/components that may form a part of the architecture 100 and are not required for explaining the invention and thus are not disclosed for the sake of clarity and conciseness. In another aspect, FIG. 1 discloses an exemplary embodiment representing "N" number of ABR players 104 (A-N) connected to the MABR client device 106 and the CDN proxy server 108. However, for the sake of brevity, going further throughout the disclosure the ABR player may be simply referred as 104, which means that the disclosure refers to any of the ABR players among "N" ABR players and same shall not be construed as limiting in any sense.

Further, in an embodiment, the at least one content source may comprise various contents such as, but not limited to, any combination of video and audio contents, internet web pages, or interactive games. In a non-limiting embodiment, the one or more content sources may comprise content servers of over the top (OTT) applications such as YouTube, YT Music, Apple Music, Netflix, Amazon Music, Spotify, Prime Videos, and the like. In another non-limiting embodiment, the one or more content sources may comprise any content server such as content servers of, but not limited to, Amazon, Facebook, Instagram, Wikipedia, Google books, Chrome, Twitter etc. The content servers of the one or more content sources (not shown) may be accessed using dedicated application or using web browsers.

Whereas, the network 110 referred in the disclosure may comprise a data network such as, but not restricted to, the Internet, Local Area Network (LAN), Wide Area Network (WAN), Metropolitan Area Network (MAN), etc. In certain embodiments, the network 110 may include a wireless network, such as, but not restricted to, a cellular network and may employ various technologies including Enhanced Data rates for Global Evolution (EDGE), General Packet Radio Service (GPRS), Global System for Mobile Communications (GSM), Internet protocol Multimedia Subsystem (IMS), Universal Mobile Telecommunications System (UMTS) etc. In one embodiment, the network 110 may include or otherwise cover networks or subnetworks, each of which may include, for example, a wired or wireless data pathway.

Referring again to FIG. 1, a primary/initial manifest (also known as master manifest) request (which is in the form of an URL) is generated by an ABR player 104. In an exemplary embodiment, the initial manifest request is generated by the ABR player 104 in response to receiving a content request from a user device (not shown). The initial manifest request is then shared with the upstream CDN proxy server 108. The upstream CDN proxy server 108 modifies the received primary manifest by adding at least a query parameter to it. Specifically, the upstream CDN proxy server 108 modifies the initial manifest request by adding an identifier that captures CDN base URL information as the query parameter, as the CDN information is lost from the initial manifest request during the process of redirection (discussed below).

The modified initial manifest URL is thereafter transmitted back to the ABR player 104 from where the modified initial manifest request is retransmitted to a rendezvous service 112. It is during this redirection the CDN information is lost from initial manifest request and thus CDN base URL information is added as the query parameter to the initial manifest request by the CDN proxy server 108 (as discussed above). Upon receiving the modified initial manifest request, the rendezvous service 112 is configured to perform mainly two functionalities (1) performing a lookup operation, at an MABR server 114, to identify MABR client device 106 associated with a user device information contained within the modified initial manifest request and (2) performing a reverse lookup operation, at the MABR server 114, to identify the channel ID to which the modified initial manifest relates to.

After the look-up operations are completed, the rendezvous service 112 is configured to update the modified initial manifest request by adding at least one of a channel ID, upstream CDN base URL information, and operator specific information if any, derived from the above lookup operations. In an exemplary embodiment, the process of updating performed at the rendezvous service 112 may also be referred as translation of the initial manifest request (throughout the forth coming paragraphs of the disclosure) as this process translate the modified initial manifest request to include at least one of a channel ID, upstream CDN base URL information and operator specific information. The translated manifest request is thereafter shared with the ABR player 104. In an exemplary aspect, the rendezvous service 112 is configured to translate only the initial manifest request coming from the ABR player 104. Thereafter, all the ABR player's 104 manifest/media segment requests are directly passed to the MABR client device 106. At ABR player, the manifest/media segment request is translated for the second time; this is discussed in detail in forthcoming paragraphs of the present disclosure.

In an exemplary embodiment, to make the above aspect possible, it is important that the configuration like the channel ID and operator specific information pertaining to the whole content are pre-configured at the MABR server 114. Further, the ABR player 104 must have a catalogue published by the packager that contains direct list of different channels and master manifest URL. In addition, the catalogue of ABR content URLs that may be served by the MABR system 102 shall also contain the mapping of the ABR content URL and the configuration of the content stored at the MABR server 114.

From the foregoing paragraphs of the disclosure, it is clear that the rendezvous service 112 only translates the initial request from the ABR player 104 to include information including at least channel ID and upstream CDN base URL information to the initial manifest request and operator specific information, if any, to the redirected URL path. Further, it is important to understand that this information is updated in the form of metadata. In an example, each parameter may be added as a name=value pair in the URL path, as exemplified below in the highlighted portion. However, the parameter name may have a unique prefix to avoid any collision and for easier extraction. https://clientgw.mabr.comlcsmabr-channelid=fox_hls/contents/fox/manifest.m3u8.

In the above exemplary URL, "csmabr-channelid" is the channel id parameter added to the original URL which is https://clientgw.csmabr.com/contents/fox/manifest.m3u8. "csmabr-" is the prefix, wherein the translated URL the location of the parameter is irrelevant. In another exemplary embodiment, this information may also be included in the translated manifest request in the form of relevant metadata in a compact binary format (e.g. protobuf) and Base-64 encode it. However, the technique of adding metadata is helpful especially if there are more parameters to be added in the manifest Request URL.

Further, before proceeding ahead, the below example may be considered to understand as to how the translation of the initial manifest request takes place during the rendezvous service 112. Precisely, the below example shows primary manifest URL translation for an HLS case: Primary Manifest URL is represented by: https://cdn1.example.com/live/fox_hls/hls.m3u8; where Channel ID is: fox_hls; and Client GW URL is: https://gw.csmabr.com As discussed above, Channel ID and Client GW URL are part of the configuration. The Channel ID is obtained by doing a lookup using the manifest request, as discussed in foregoing paragraphs. Thus, after translation at the rendezvous service 112 the translated output manifest request appears as: https://gw.csmabr.com/csmabr-cdnbase=https%3A%2F%2Fcdnl.example.com/csmabr-channelid=fox_hls/live/fox_hls/hls.m3u8.

It may be further acknowledged that the csmabr-cdnbase parameter contains the URL encoded base URL of the original request to the rendezvous service 112. Further, this parameter is required by the MABR client device 106 to fetch the media segments from the upstream CDN in case of a cache miss. This is discussed in forthcoming paragraphs of the disclosure.

Going forward, after the initial manifest request is translated by the rendezvous service, all the content requests, originating from the ABR player 104, are passed through the MABR Client device 106. This gives an opportunity to the MABR client device 106 to read and rewrite the URLs present in the manifest request. In an exemplary embodiment, the MABR client device 106 may parse each and every incoming manifest URL and may derive the representation IDs for the same. In particular, as shown in FIG. 1, the translated initial manifest request is now shared with the MABR client device 106.

Figure 2:
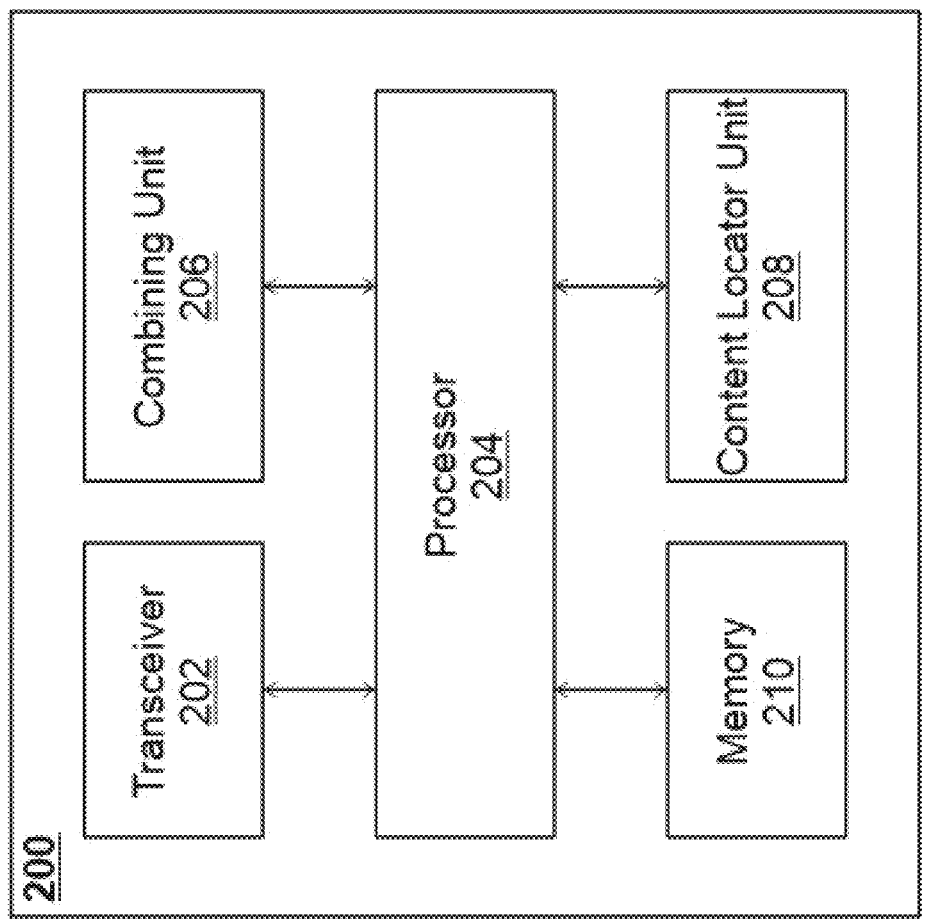
FIG. 2 shows a block diagram 200 of an MABR Client device as illustrated in FIG. 1.

Further, referring to FIG. 2 in conjunction with FIG. 1, it may be appreciated that the MABR client device 106 is shown having a transceiver 202 configured to receive manifest requests from an ABR player 104. In an exemplary embodiment, as discussed above, the initial manifest request is redirected to the MABR client device 106 by a rendezvous service 112 upon updating/translating the manifest request with a channel ID and an upstream CDN base information and thereafter the subsequent content/manifest request from the ABR player 104 are directly received by the transceiver 202 of the MABR client device 106. Moving on, the MABR client device 106 may also include a processor 204 operatively coupled to the transceiver 202. The processor 204 may be configured to translate, once again, the received manifest request by adding the representation ID, wherein the representation ID uniquely identifies a variant stream within an ABR content. In a specific embodiment, to translate the manifest request, the processor 204 of the MABR client device 106 is configured to fetch the manifest from the upstream CDN proxy server 108 in response to receiving the manifest request from the ABR player 104 and subsequently derive the representation ID from the fetched manifest. Further, as shown in FIG. 2, the MABR client device 106 may also include a combining unit 206 operatively coupled to the processor 204. The combining unit 206 is configured to obtain a stream ID by combining the channel ID and the representation ID contained within the translated manifest request, wherein the stream ID is configured to uniquely identify a variant stream in the entire MABR system 102.

Moving on, FIG. 2, in addition may include content locator unit 208 operatively coupled to the processor 204. The content locator unit 208 may be configured to perform a look up in a cache 116 for the media content requested in the translated manifest request using the stream ID. In case, the same content has been requested earlier over the multicast system, the MABR system 102 will have it stored in the cache 116 and will be able to provide the media content requested in the translated manifest URL, i.e., in case of cache hit. Alternatively, if the content has not been requested over the MABR system 102 earlier by the ABR player 104 and the content locator unit 208 in unable to find a hit in the cache 116, the MABR client device 106 may redirect the request to CDN proxy Server 108. The CDN proxy server 108 may reach out to numerous upstream CDN's 108-1A, 108-1B . . . 108-1N connected to the CDN proxy server 108, as shown in FIG. 1. In particular, the CDN proxy server 108 may fetch the requested media segments from one of the upstream CDN's 108-1A, 108-1B . . . 108-1N and provide it to the MABR client device 106 which may then share the requested content with the ABR player 104.

In an exemplary embodiment, the at least one processor 204 may include, but not restricted to, a general-purpose processor, a Field Programmable Gate Array (FPGA), an Application Specific Integrated Circuit (ASIC), a Digital Signal Processor (DSP), microprocessors, microcomputers, micro-controllers, digital signal processors, central processing units, state machines, logic circuitries, and/or any devices that manipulate signals based on operational instructions. Further, a memory 210 may be communicatively coupled to the processor 204. The memory 210 may comprise various data and one or more instructions that are executable by the processor 204 and may be required to translate the manifest request URL received from the ABR player 104. The memory 210 may include a Random-Access Memory (RAM) unit and/or a non-volatile memory unit such as a Read Only Memory (ROM), optical disc drive, magnetic disc drive, flash memory, Electrically Erasable Read Only Memory (EEPROM), a memory space on a server or cloud and so forth.

In a non-limiting embodiment of the present disclosure, two types of memory may be primarily used by the MABR Client device 106 i.e., RAM and Flash memory (not shown in Figures). The RAM is a memory that is available to the processor 204 when the MABR Client device 106 is booted up and running. RAM is essential to run and execute applications, but RAM loses its contents when the MABR Client device 106 is turned off or if the content is not refreshed by an external charge. Thus, RAM is considered volatile memory. On the other hand, the flash memory is non-volatile in nature and may store core applications of a cable video service, which include firmware, middleware etc.

In a non-limiting embodiment of the present disclosure, all components of the MABR Client device 106 may be integrated onto a single chip named as a system on a chip (SoC). The SoC is an integrated circuit that takes a single platform and integrates an entire electronic or computer system onto it. This embodiment is particularly helpful for reducing the energy waste, saving the spending costs, and reducing the space occupied by individual components.

Figure 3:
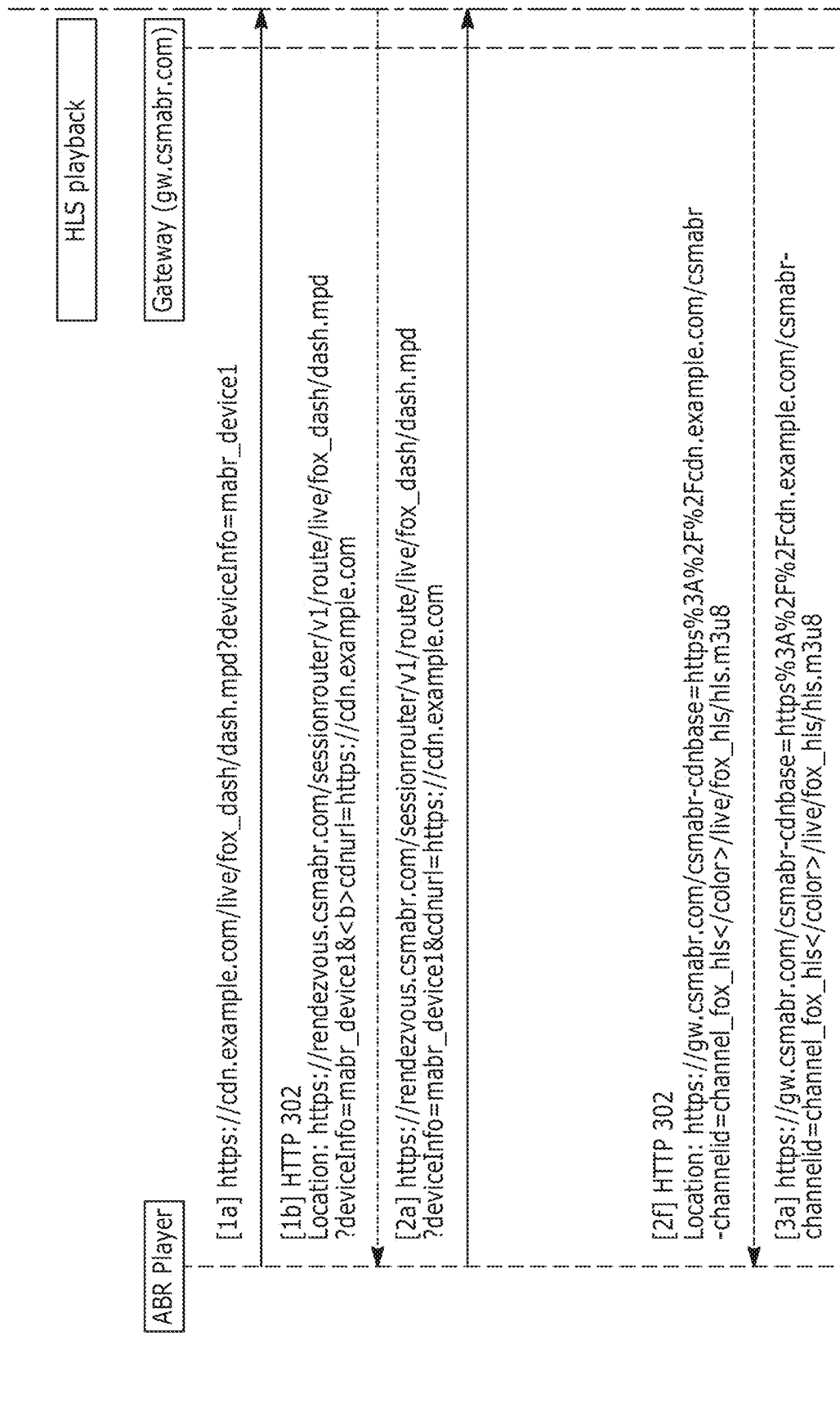
FIG. 3 shows a sequence diagram illustrating the flow of information between various entities of the MABR system 102 and the plurality of Content Delivery Network (CDN), for efficient content delivery, in HLS playback format.
Figure 3:
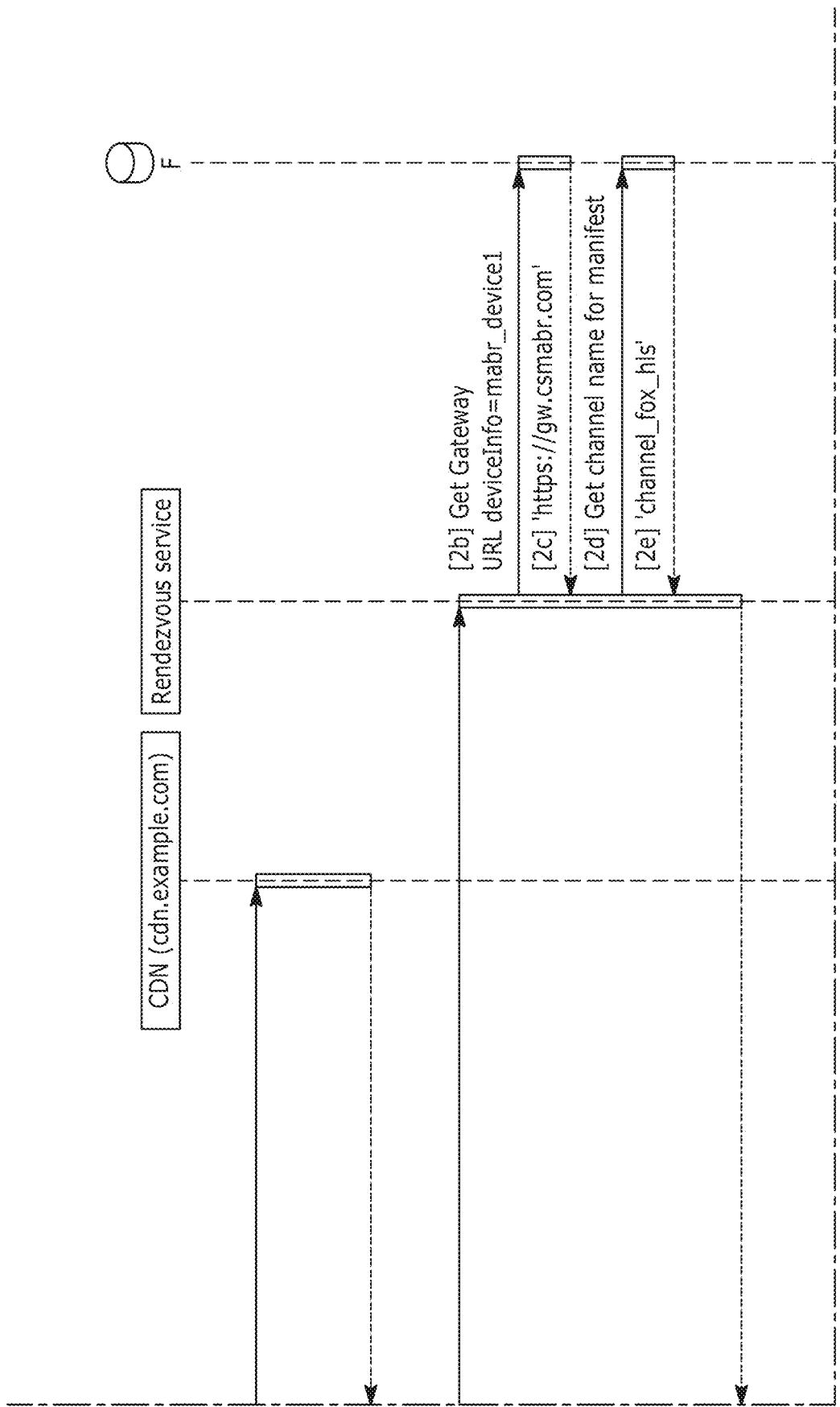
Figure 3:
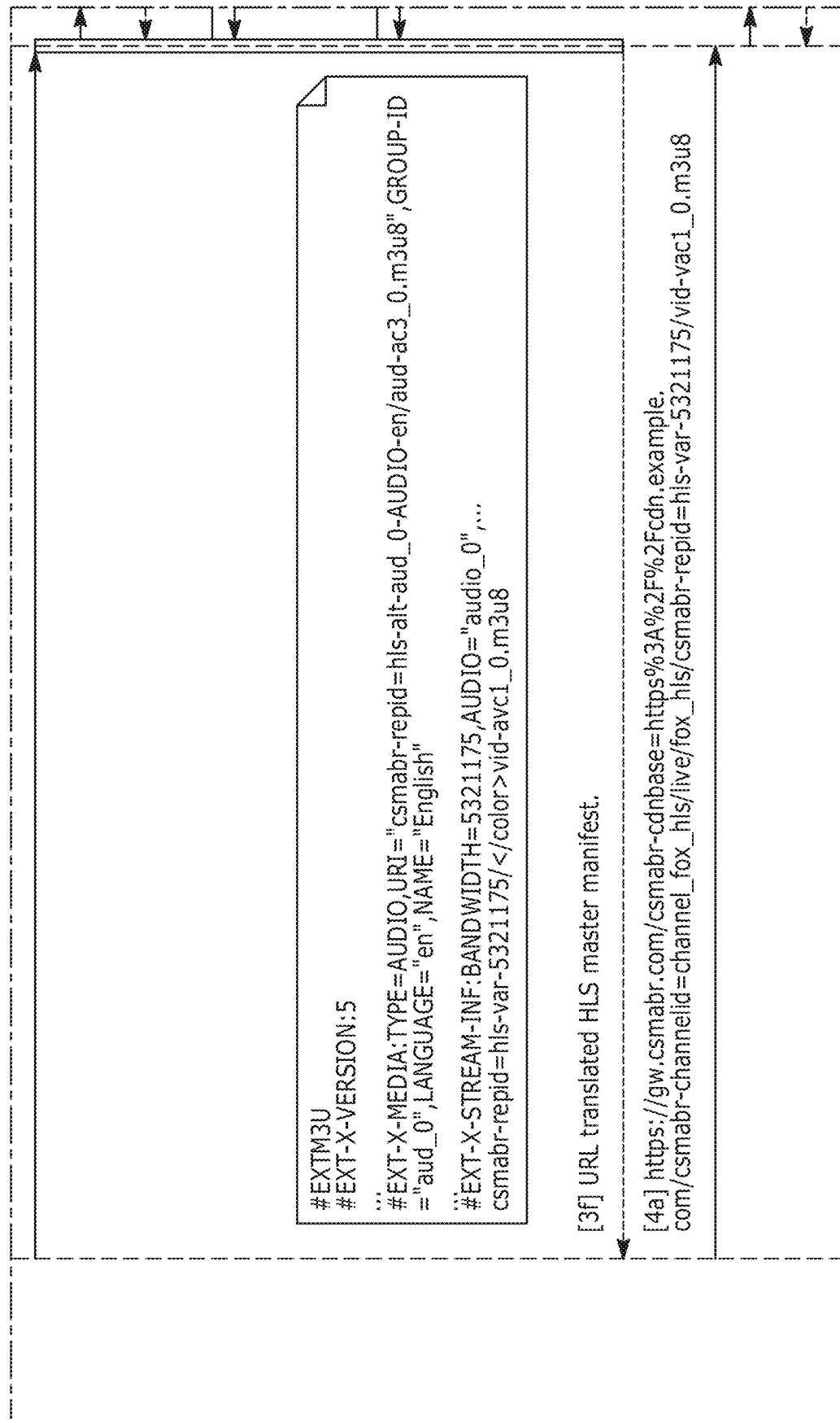
Figure 3:
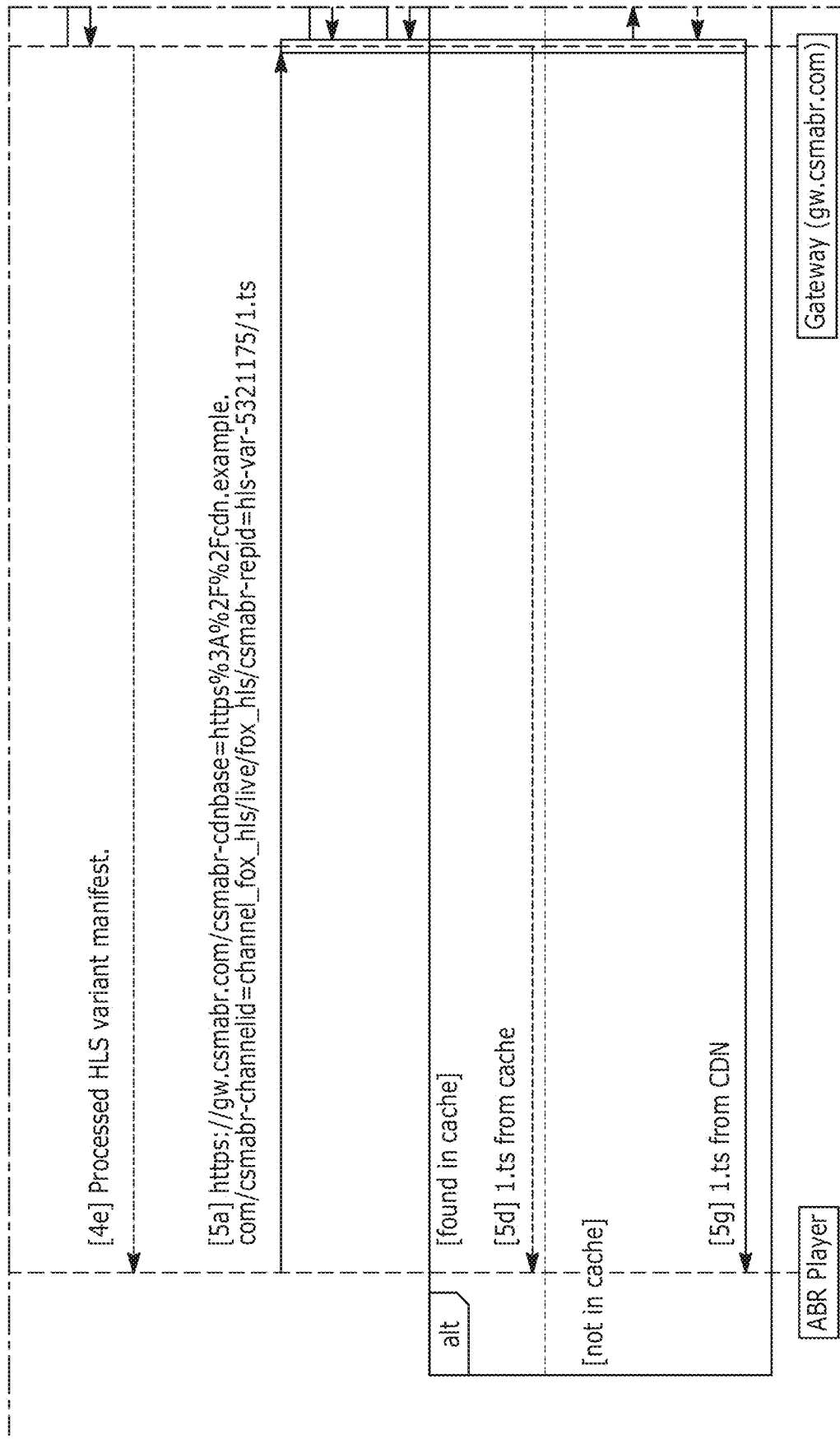

Referring now to FIG. 3, which recites a sequence diagram illustrating the flow of information between various entities of the MABR system 102 and the Content Delivery Network (CDN) 108 for efficient content delivery, when using HLS playback format. As shown in FIG. 3, the process 300 starts with step (1*a*) where the initial manifest request, originating from the ABR player 104, is shared with the CDN proxy server 108. The CDN proxy server 108 as shown in step (1*b*) modifies the received initial manifest request by adding a query parameter to it. In an embodiment, the CDN proxy server 108, at step (1*b*) modifies the initial manifest request URL with an identifier to capture CDN base URL information as the query parameter. Those skilled in the art will appreciate that the CDN base URL information is lost from the initial manifest request during the process of redirection performed at step (2*a*) and hence CDN base URL information is updated as the query parameter in the primary manifest request URL.

At step (2*a*), the updated primary manifest URL is shared with the rendezvous service 112, by the ABR player 104. The rendezvous service 112 may then perform a first lookup operation, at an MABR server 114, to identify MABR client device 106 associated with user device information contained within the modified initial manifest request and a second reverse lookup operation, at the MABR server 114, to identify the channel ID to which the modified initial manifest request relates to. Further, upon retrieving these (a channel ID, upstream CDN base URL information and operator specific information) parameters the rendezvous service 112 is configured to update/translate, a first time, the primary manifest request by adding at least one of the channel ID, the upstream CDN base URL information and the operator specific information, as shown in steps 2(*b*)-2(*e*). Further, as shown in step 2(*f*), the translated manifest request is sent back to the ABR player 104.

In an embodiment, the functionalities performed in steps 1(*a*)-2(*f*) involve interaction only between the ABR Player 104, the CDN proxy Server 108 and the rendezvous service 112. Further, the rendezvous service 112 is configured to translate only the initial/primary manifest request (as shown in step 1(*a*)) coming from the ABR player 104. Thereafter, all the ABR player's 104 manifest/media segment requests are directly passed to the MABR-client 106, where manifest/media segment requests are translated again, as discussed in detail in the forthcoming paragraphs of the present disclosure, as shown in steps 3(*a*)-5(*c*).

As shown in step 3(*a*) of FIG. 3, the translated initial manifest request having the added parameters such as channel ID, upstream CDN base URL information and operator specific information is shared with the MABR client device 106. In response, the MABR client device 106 decodes the received initial translated manifest request and fetches HLS master manifest from CDN proxy server 108, as shown in steps 3(*b*) and 3(*c*) respectively. In an exemplary embodiment, as shown in the snippet in sequence diagram 300, the master manifest contains two type of manifest data (1) Audio manifest and (2) Video manifest. Upon successfully fetching the HLS master manifest from the CDN proxy server 108, the MABR client device 106 is configured to derive the representation ID, as shown in step 3(*d*). In an embodiment, to derive the representation ID for audio manifest, the MABR client device 106 uses group ID, language and type of data as an attribute. Further, to derive the representation ID for the video manifest, the MABR client device 106 uses bandwidth as an attribute. The MABR client device 106 again translates the received manifest request by adding the derived representation ID, as shown in step 3(*e*). In an aspect, the representation ID uniquely identifies a variant stream within an ABR content.

The sequence diagram 300 at step 3(*f*) discloses sharing the post translated HLS master manifest request with the ABR player 104. As may be seen from the sequence diagram 300, the process further includes at step 4(*a*), receiving, at the MABR client device 106, the translated master manifest URL, from the ABR player 104. As may be seen, steps 4(*b*)-4(*d*), of the process 300, discloses decoding the received post translated HLS master manifest, fetching the variant manifest from the upstream CDN Proxy server 108 and translating absolute URL, if present. Those skilled in the art will appreciate that in HLS playback format, fetching of the manifest from the upstream CDN device, in response to receiving the translated manifest request comprises downloading a master manifest and a variant manifest, separately.

Once, the absolute URL is translated, the processed HLS variant manifest is shared with the ABR player 104. The ABR player 104 at step 5(*a*), in search of retrieving the required content, may then share the absolute translated URL with the MABR client device 106. The MABR client device 106 may then obtain a stream ID by combining the channel ID and the representation ID together. The stream ID is configured to uniquely identify a variant stream in the entire MABR system 102, as shown in step 5(*b*). Once the stream ID is constructed, the MABR client device 106 is configured to perform cache 116 lookup for media content requested in the manifest request using the stream ID, and provide the media content requested in the manifest URL if a match in the cache 116 is found, as shown in steps 5(*c*)-5(*d*). Otherwise, upon performing the lookup, if a match is not found in the cache 116, then the MABR client device 106 is configured to fetch the media segments from the upstream CDN, via the CDN proxy server 108, as shown in steps 5(*e*)-5(*g*).

Figure 4:
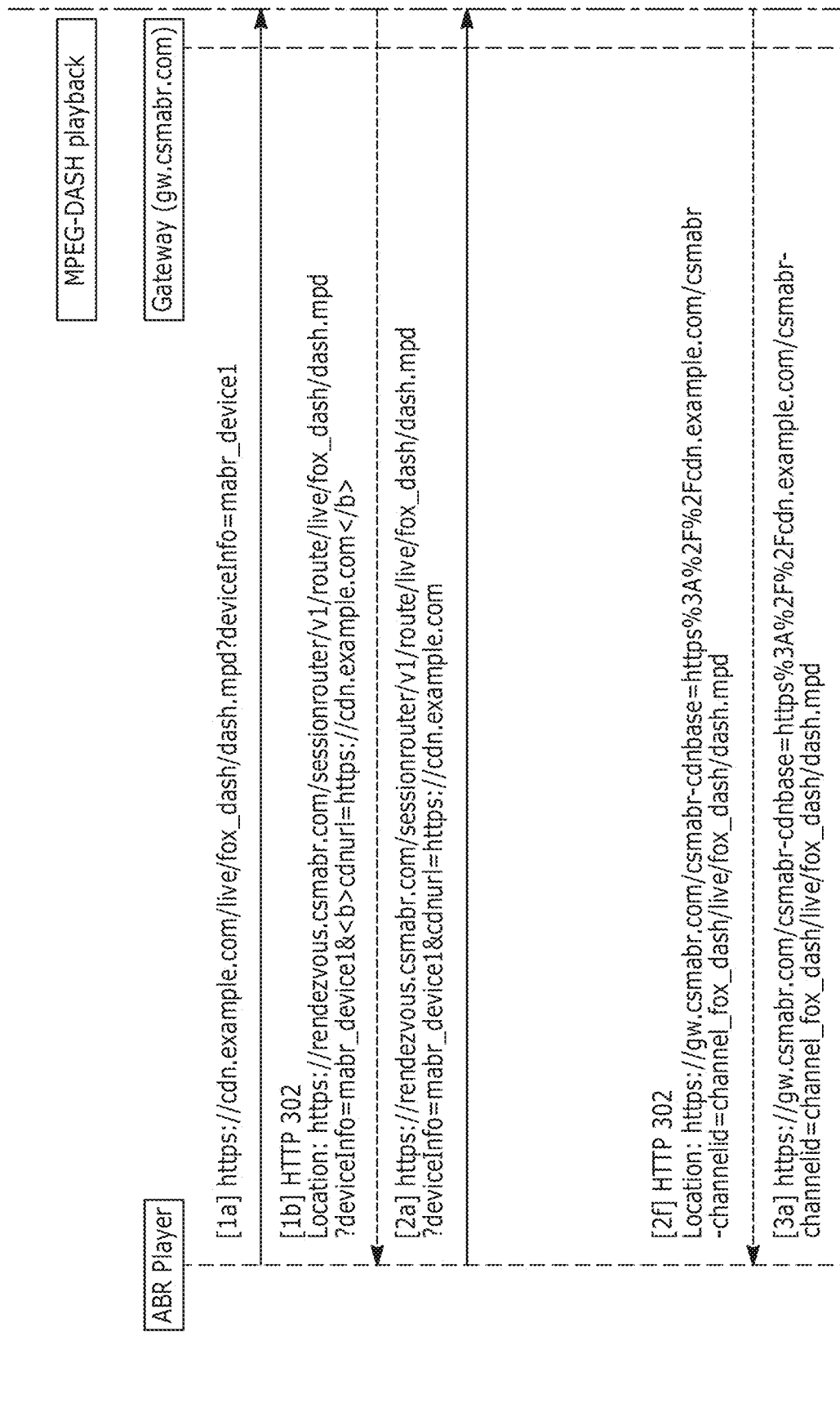
FIG. 4 shows another sequence diagram illustrating the flow of information between various entities of the MABR system 102 and the plurality of Content Delivery Network (CDN), for efficient content delivery, in MPEG-DASH playback format.
Figure 4:
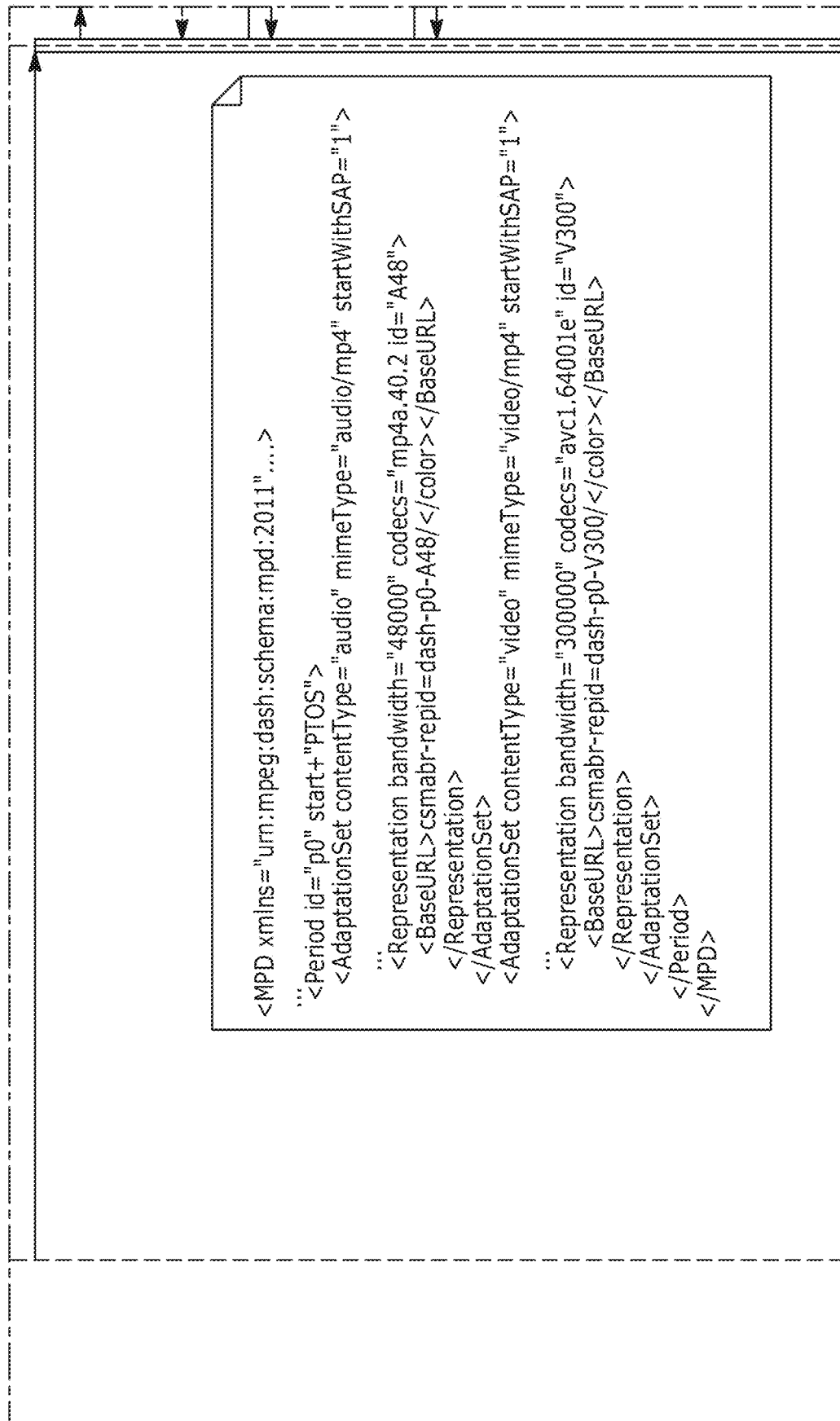
Figure 4:
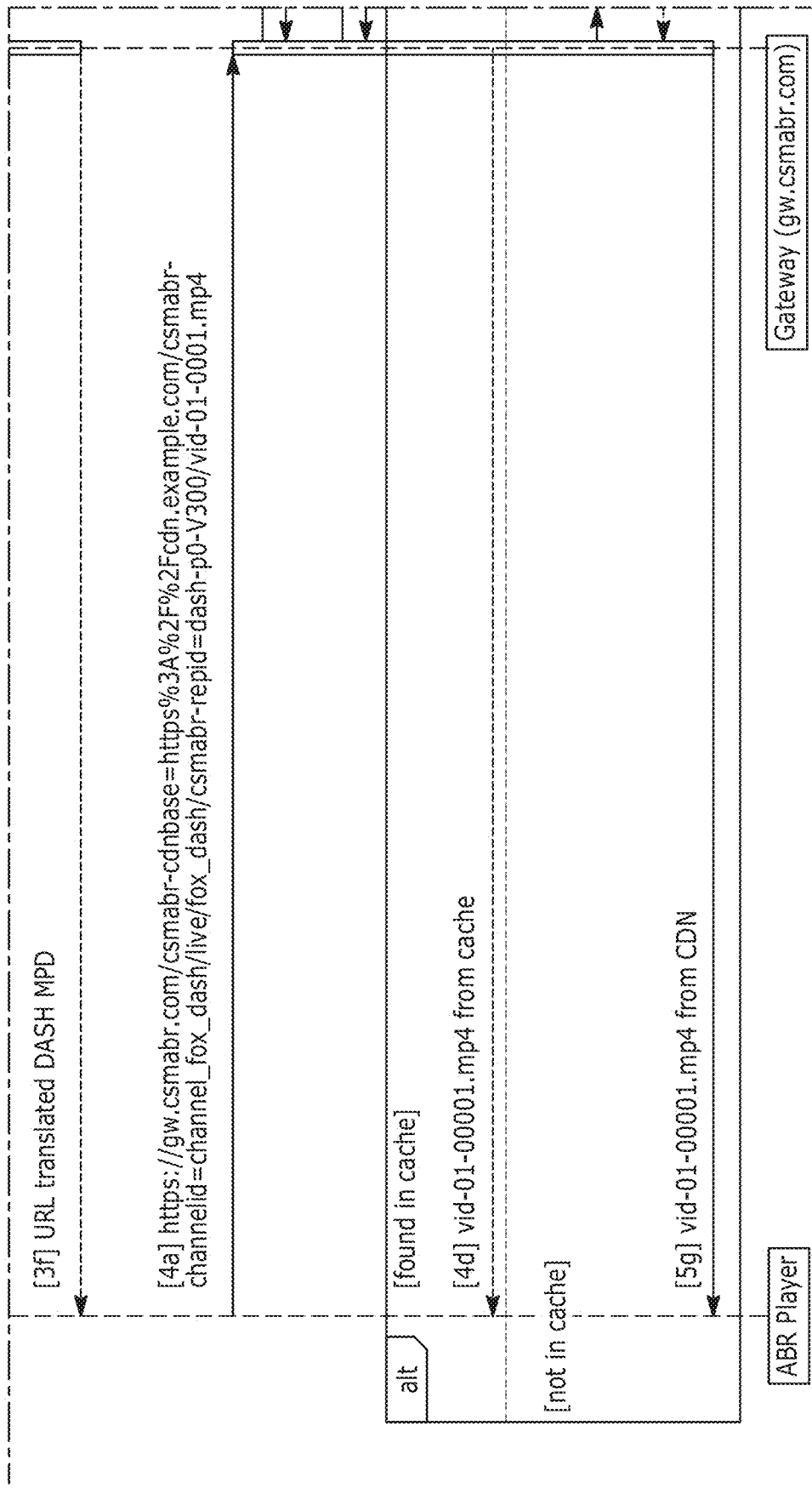
Figure 4:
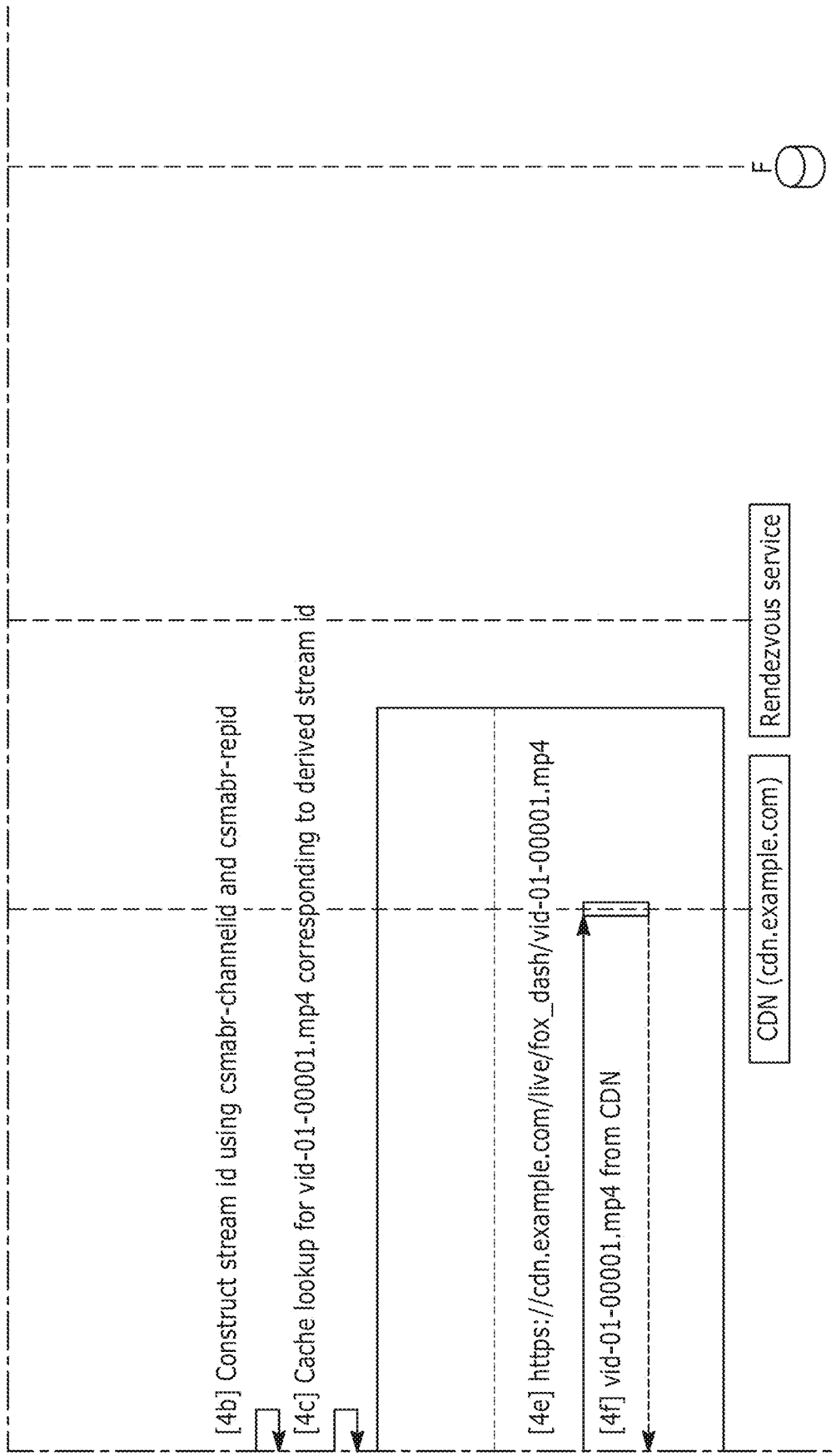

FIG. 4 shows in MPEG-DASH playback format a sequence diagram illustrating the flow of information between various entities of the MABR system 102 and the plurality of Content Delivery Network (CDN) for efficient content delivery. Those skilled in the art will appreciate that the process performed in sequence diagram 400 is similar to that performed in the sequence diagram 300. The only difference between these two processes is that, unlike HLS playback format, in MPEG-DASH playback format, instead of two separate manifests (i.e. master manifest and variant manifest) one single manifest in the form of DASH MPD file is downloaded. The explanation of entire process is avoided for the sake of brevity.

Figure 5A:
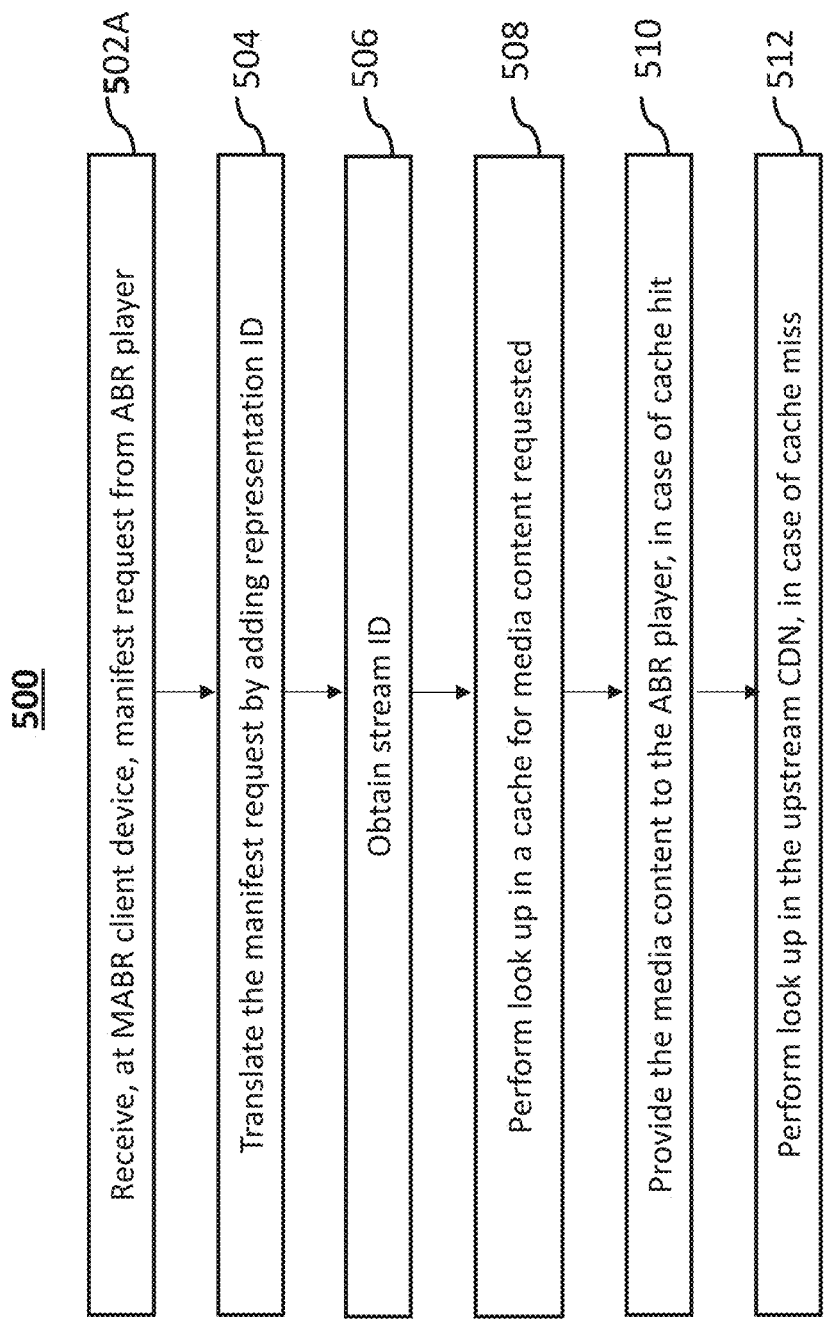
FIG. 5A depicts a flowchart 500A illustrating an exemplary method for allowing efficient content delivery in a Multicast Adaptive Bit rate (MABR) system.

Referring now to FIG. 5A, a flowchart illustrating a method for allowing efficient content delivery in a Multicast Adaptive Bit rate (MABR) system is disclosed.

As illustrated in FIG. 5, the method 500 includes one or more flow steps illustrating a method for allowing efficient content delivery in a Multicast Adaptive Bit rate (MABR) system. The method 500 may include, at step 502A, receiving, at an MABR client device 106, a manifest request from an ABR player 104, wherein the manifest request is initially redirected to the MABR client device 106 by a rendezvous service 112 upon updating the manifest request with a channel ID and an upstream CDN base information. In an embodiment, the operations performed at steps 502A may be performed by the transceiver 202 in combination with the processor 204 of the MABR client device 106 of FIG. 2.

Figure 5B:
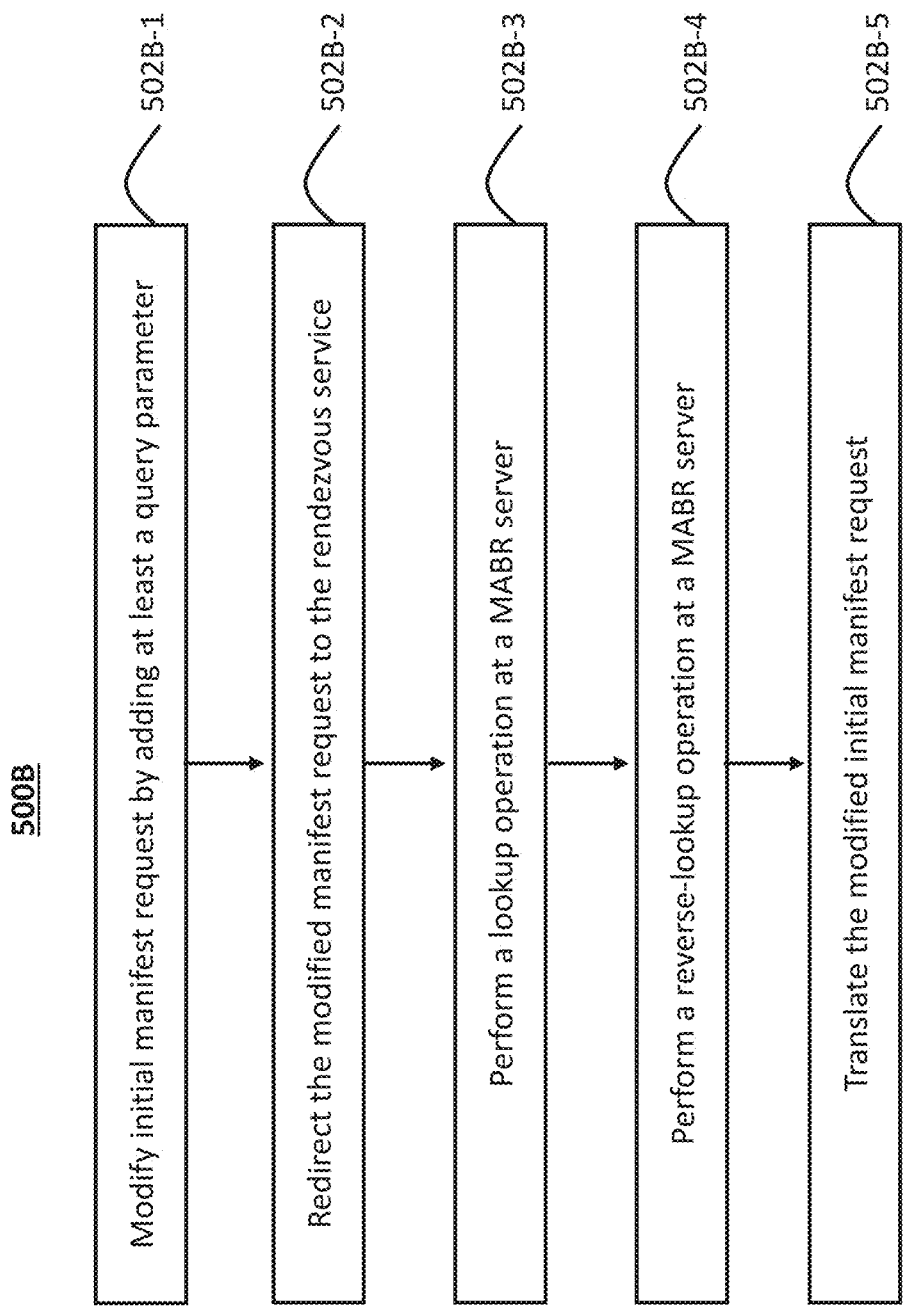
FIG. 5B depicts another flowchart 500B illustrating an exemplary sub-method for allowing efficient content delivery in a Multicast Adaptive Bit rate (MABR) system.

To understand how the manifest request is initially redirected to the MABR client device 106 by the rendezvous service 112, as shown in at the step 502A, reference to sub-method 500B, disclosed in FIG. 5B may be made. The method 500B discloses, at step 502B-1, modifying an initial manifest request, received at the upstream CDN proxy server 108, from the ABR player 104 by adding at least a query parameter. In an embodiment, the initial manifest request is modified with an identifier to capture CDN information as the query parameter, as the CDN information is lost from the initial manifest request during the process of redirection. The method 500B at step 502B-2 discloses redirecting the modified initial manifest request to the rendezvous service 112. The subsequent steps of the method 500B are then performed at the rendezvous service 112.

In particular, the rendezvous service 112 at step 502B-3 may be configured to perform a lookup operation, at an MABR server 114, to identify MABR client device 106 associated with user device information contained within the updated primary manifest URL. Further, the rendezvous service 112 may be configured to perform a reverse lookup operation, at the MABR server 114, to identify the channel ID to which the modified initial manifest request relates to, at step 502B-4. The sub-method 500B, discloses at step 500B-5 translating the modified initial manifest request by adding at least one of channel ID, CDN proxy base URL information and operator specific information obtained from look up operations performed at steps 502B-3 and 502B-4. The method 500B, though not disclosed explicitly but includes transmitting subsequently the translated initial manifest request to the ABR player 104.

The method 500 of FIG. 5A, discloses, at step 504, translating, by the MABR client device 106, the redirected manifest request received from the ABR player 104 by adding representation ID, wherein the representation ID uniquely identifies a variant stream within a media content. Though, not exclusively disclosed, the method 500 for performing step 504, is inherently configured to perform the steps of fetching a manifest from an upstream CDN proxy server 108, in response to receiving the manifest request and deriving the representation ID from the fetched manifest.

At step 506, the method 500 at step 506, discloses obtaining a stream ID by combining the channel ID and the representation ID. In an exemplary embodiment, the process of step 506 may be performed by the combining unit 206 in combination with the processor 204 of the MABR client device 106. Those skilled in art will appreciate that the stream ID is configured to uniquely identify a variant stream in the entire MABR system 102. Using the obtained stream ID, the method 500, at step 508, is configured for performing lookup in a cache 116 for media content, requested in the translated manifest request. The method 500, at step 510, discloses providing the media content requested in the translated manifest request to the ABR player 104 if a match in the cache 116 is found. However, if the media content is not found in the cache 116, the method 500 moves to step 512 that discloses fetching the media segments from the upstream CDN device 108A-108N using the CDN proxy server 108.

It is to be appreciated that the teachings of above disclosure provide an efficient technique for content delivery in an MABR system. Moreover, the teachings of the disclosure allow to translate the CDN URL of the ABR content to include the required parameters as a metadata so that the MABR client device 106 may have all the necessary information just by looking at the translated URL of the incoming media segment requests from the ABR player 104. In other words, the above techniques allow to add necessary information, in the form of metadata, in the CDN URL of the ABR content so that a particular request may be associated to one of the existing contents supported by the MABR server 114 or redirected to an upstream CDN proxy server 108 on a cache miss.

The above methods may be described in the general context of computer executable instructions. Generally, computer executable instructions can include routines, programs, objects, components, data structures, procedures, modules, and functions, which perform specific functions or implement specific abstract data types. In one aspect, the methods may be performed by an apparatus comprising the processor 204 and the memory 210 of the MABR client device 106.

The order in which the various operations of the methods are described is not intended to be construed as a limitation, and any number of the described method flow steps can be combined in any order to implement the method. Additionally, individual blocks may be deleted from the methods without departing from the spirit and scope of the subject matter described herein. Furthermore, the methods can be implemented in any suitable hardware, software, firmware, or combination thereof.

The various operations of methods described above may be performed by any suitable means capable of performing the corresponding functions. The means may include various hardware and/or software component(s) and/or module(s), including, but not limited to the processor 204 of FIG. 2 and the various units of FIG. 2. Few operations of the methods may be implemented at an external server as well. Generally, where there are operations illustrated in Figures, those operations may have corresponding counterpart means-plus-function components.

In a non-limiting embodiment of the present disclosure, one or more non-transitory computer-readable media may be utilized for implementing the embodiments consistent with the present disclosure. A computer-readable media refers to any type of physical memory (such as the memory 210) on which information or data readable by a processor may be stored. Thus, a computer-readable media may store one or more instructions for execution by the processor 204, including instructions for causing the processor 204 to perform steps or stages consistent with the embodiments described herein. The term "computer-readable media" should be understood to include tangible items and exclude carrier waves and transient signals. By way of example, and not limitation, such computer-readable media can comprise Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Thus, certain aspects may comprise a computer program product for performing the operations presented herein. For example, such a computer program product may comprise a non-transitory computer readable media having instructions stored (and/or encoded) thereon, the instructions being executable by one or more processors to perform the operations described herein. For certain aspects, the computer program product may include packaging material.

The various illustrative logical blocks, modules, and operations described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may include a microprocessor, but in the alternative, the processor may include any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

As used herein, a phrase referring to "at least one" or "one or more" of a list of items refers to any combination of those items, including single members. As an example, "at least one of: a, b, or c" is intended to cover: a, b, c, a-b, a-c, b-c, and a-b-c. The terms "a", "an" and "the" mean "one or more", unless expressly specified otherwise.

The terms "an embodiment", "embodiment", "embodiments", "the embodiment", "the embodiments", "one or more embodiments", "some embodiments", and "one embodiment", "other embodiment", "yet another embodiment", "non-limiting embodiment" mean "one or more (but not all) embodiments of the disclosure(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

A description of an embodiment with several components in communication with each other does not imply that all such components are required. On the contrary, a variety of optional components are described to illustrate the wide variety of possible embodiments of the disclosed methods and systems.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the appended claims.

REFERRAL NUMERALS

| Reference Number | Description |
| --- | --- |
| 100 | HIGH-LEVEL ARCTICTUTRE FOR MABR SYSTEM AND CDN INTERGARTION |

-continued

| Reference Number | Description |
| --- | --- |
| 102 | MABR SYSTEM |
| 104A-104N | ABR PLAYERS |
| 106 | MABR CLIENT DEVICE |
| 108 | CDN PROXY SERVER |
| 108A-108N | CDN's |
| 110 | NETWORK |
| 112 | RENDEZVOUS SERVICE |
| 114 | MABR SERVER |
| 116 | CACHE |
| 200 | BLOCK DIAGRAM OF MABR CLIENT DEVICE |
| 202 | TRANCEIVER |
| 204 | PROCESSOR |
| 206 | COMBINING UNIT |
| 208 | CONTENT LOCATOR UNIT |
| 210 | MEMORY |
| 300 | SEQUENCE FLOW DIAGRAM |
| 400 | SEQUENCE FLOW DIAGRAM |
| 500 | METHOD FLOW CHART |
| 500B | SUB-METHOD FLOW CHART |
| 502A-512 | METHOD STEPS |
| 502B2-502B10 | SUB-METHOD STEPS |

We claim:

1. A method for content delivery in a Multicast Adaptive Bit Rate MABR system, the method comprising:
    receiving, at an MABR client device, a manifest request from an Adaptive Bit Rate ABR player that includes a first channel ID, wherein the manifest request is initially redirected to the MABR client device by a rendezvous service upon updating the manifest request from the ABR player with a second channel ID and an upstream CDN base information, where said second channel ID is a logical representation of a channel in the form of meta-data that does not resolve as part of a URL to particular media content;
    translating, by the MABR client device, the manifest request by adding representation ID, wherein the representation ID uniquely identifies a variant stream within a media content, where a plurality of different variant streams are available within said media content;
    obtaining a stream ID by combining the second channel ID and the representation ID;
    performing a lookup in a cache for the media content, requested in the translated manifest request and using the obtained stream ID;
    selectively providing the media content to the ABR player if the media content is present within the cache; and
    selectively performing a search in upstream CDN's if the media content is not present within the cache.

2. The method of claim 1, wherein the updating the manifest request further comprises:
    receiving, at the rendezvous service, an initial manifest request having a query parameter included therein;
    performing a lookup operation, at an MABR server, to identify MABR client associated with user device information contained within the updated manifest request; and
    performing a reverse lookup operation, at the MABR server, to identify the second channel ID corresponding to the updated initial manifest request.

3. The method of claim 1, further comprising
    fetching a manifest from an upstream CDN proxy server in response to receiving the manifest request from the ABR player; and
    deriving the representation ID from the fetched manifest.

4. The method of claim 2, wherein the query parameter is added to the initial manifest request as an identifier to capture CDN base information, in response to receiving the initial manifest request, at the upstream CDN proxy server, from the ABR player.

5. The method of claim 3, wherein the fetching of the manifest from the upstream CDN proxy server further comprises:
    separately downloading a master manifest and a variant manifest when using HLS playback format; and
    downloading one-time manifest in the form of DASH MPD file when using MPEG-DASH playback format.

6. A Multicast Adaptive Bit Rate (MABR) system for content delivery, the MABR system comprising:
    an Adaptive Bit Rate (ABR) player;
    a Content Delivery Network (CDN) proxy server operatively coupled to the ABR player; and
    an MABR client device operatively coupled to the CDN proxy server and the ABR player, the MABR client device comprising a transceiver configured to receive a manifest request from the ABR player that includes a first channel ID, wherein the manifest request is initially redirected to the MABR client device by a rendezvous service upon updating the manifest request from the ABR player with a second channel ID, where said second channel ID is a logical representation of a channel in the form of meta-data that does not resolve as part of a URL to particular media content, and an upstream CDN base information and a processor operatively coupled to the transceiver and configured to:
        translate the manifest request by adding representation ID, wherein the representation ID uniquely identifies a variant stream within a media content, where a plurality of different variant streams are available within said media content;
        obtain a stream ID by combining the second channel ID and the representation ID;
        perform look up in a cache for the media content, requested in the translated manifest request, using the obtained stream ID; and
        selectively provide the media content to the ABR player if the media content is present within the cache; and
        selectively perform a search in upstream CDN's, if the media content is not present within the cache.

7. The system of claim 6, wherein to update the manifest, the rendezvous service is further configured to:
    receive an initial manifest request, from the ABR player, having a query parameter included therein;
    perform a lookup operation, at an MABR server, to identify MABR client associated with device information contained within the updated manifest request; and
    perform a reverse lookup operation, at the MABR server, to identify the second channel ID corresponding to the updated initial manifest request.

8. The system of claim 6, wherein the processor is further configured to:
    fetch a manifest from upstream CDN proxy server, in response to receiving the manifest request from the ABR player; and
    derive the representation ID from the fetched manifest.

9. The system of claim 7, wherein the query parameter is added to the initial manifest request as an identifier to capture CDN base information, in response to receiving the initial manifest request, at the upstream CDN proxy server, from the ABR player.

10. The system of claim 8, wherein in order to fetch the manifest from the upstream CDN proxy server, the processor is further configured to:

download a master manifest and a variant manifest, separately, when using HLS playback format; or download one-time manifest, in the form of DASH MPD file, when using MPEG-DASH playback format.

11. A non-transitory computer readable media storing one or more instructions executable by at least one processor, the one or more instructions comprising:

one or more instructions for receiving, at an Multicast Adaptive Bit Rate MABR client device, a manifest request from an Adaptive Bit Rate ABR player that includes a first channel ID, wherein the manifest request from the ABR player is initially redirected to the MABR client device by a rendezvous service upon updating the manifest request with a second channel ID and an upstream CDN base information, where said second channel ID is a logical representation of a channel in the form of meta-data that does not resolve as part of a URL to particular media content;

one or more instructions for translating, by the MABR client device, the manifest request by adding representation ID, wherein the representation ID uniquely identifies a variant stream within a media content, where a plurality of different variant streams are available within said media content;

one or more instructions for obtaining a stream ID by combining the second channel ID and the representation ID;

one or more instructions for performing look up in a cache for the media content, requested in the translated manifest request, using the obtained stream ID; and one or more instructions for selectively providing the media content to the ABR player if the media content is present within the cache; and one or more instructions for selectively performing a search in upstream CDN's, if the media content is not present within the cache.

12. The non-transitory computer readable media of claim 11, wherein the one or more instructions for updating the manifest request further comprise:

one or more instructions for receiving, at the rendezvous service, an initial manifest request having a query parameter included therein;

one or more instructions for performing a lookup operation, at an MABR server, to identify MABR client associated with user device information contained within the updated manifest request;

one or more instructions for performing a reverse lookup operation, at the MABR server, to identify the second channel ID corresponding to the updated initial manifest request.

13. The non-transitory computer readable media of claim 11, further comprises:

one or more instruction for fetching a manifest from an upstream CDN proxy server, in response to receiving the manifest request from the ABR player; and one or more instruction for deriving the representation ID from the fetched manifest.

14. The non-transitory computer readable media of claim 12, further comprise:

one or more instructions for adding the query parameter, to the initial manifest request as an identifier to capture CDN base information, in response to receiving the initial manifest request, at the upstream CDN proxy server, from the ABR player.

15. The non-transitory computer readable media of claim 13, wherein the one or more instructions for fetching the manifest from the upstream CDN device further comprises:

one or more instructions for downloading a master manifest and a variant manifest, separately, when using HLS playback format; or one or more instructions for downloading one-time manifest, in the form of DASH MPD file, when using MPEG-DASH playback format.

* * * * *